United States Patent Office 2,951,081
Patented Aug. 30, 1960

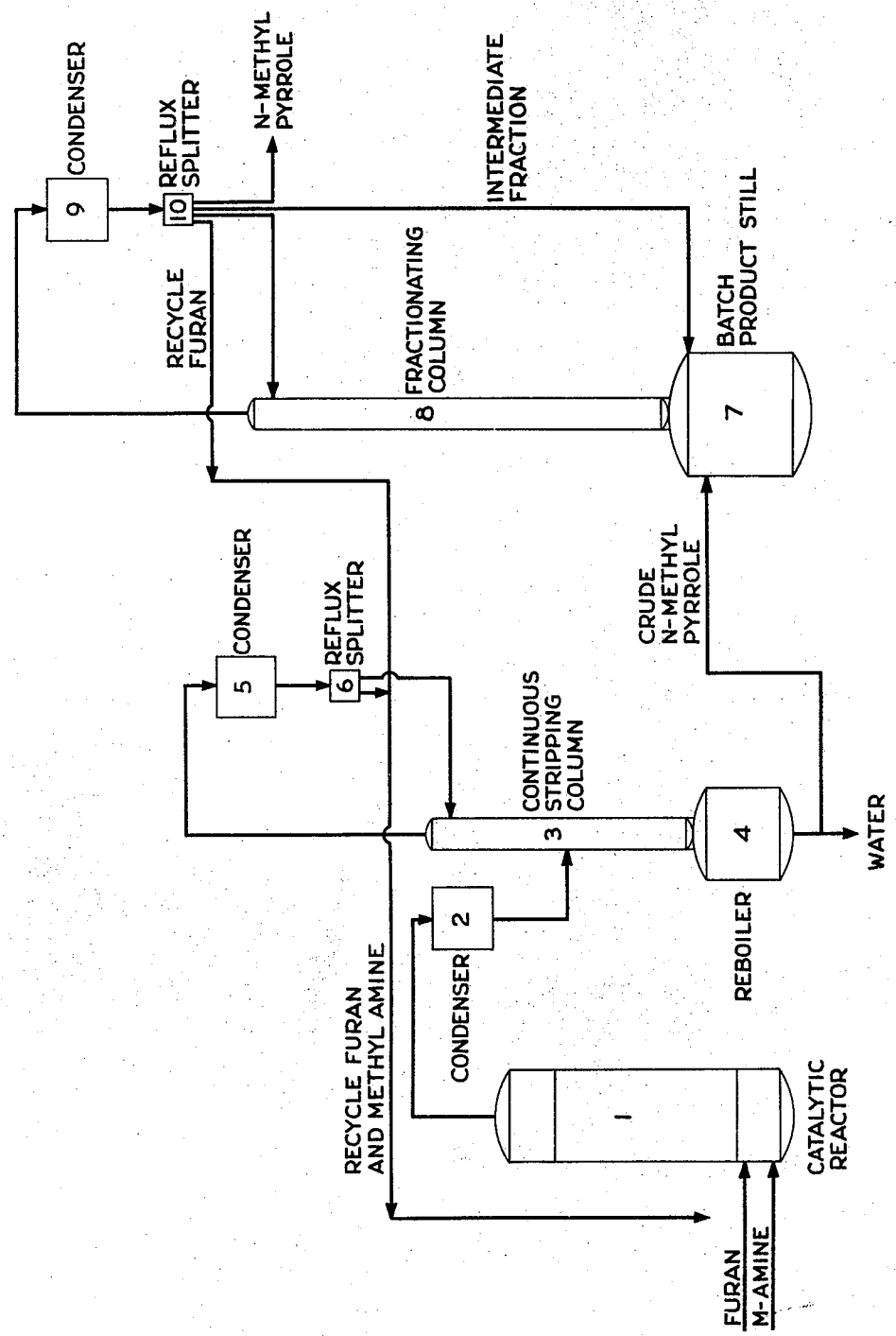

2,951,081

PROCESS FOR MAKING N-METHYL PYRROLE

David S. Rosenberg and Edward Weil, Niagara Falls, N.Y., assignors to Hooker Chemical Corporation, a corporation of New York Filed May 20, 1957, Ser. No. 660,248

1 Claim. (Cl. 260—313)

This invention is an improved process for making N-methyl pyrrole by the reaction of furan and methyl amine in the presence of a catalyst, using substantially anhydrous reactants.

The basic reaction involved in this process is

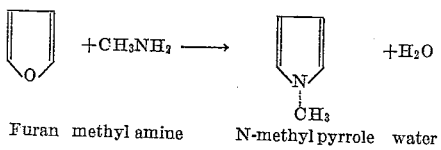

Furan    methyl amine    N-methyl pyrrole    water

Yur'ev, J. Gen. Chem. (U.S.S.R.) 8, 1936, conducted the reaction in the presence of a dehydration catalyst with a molar excess of methyl amine to furan at temperatures above 400 degrees centigrade, obtaining relatively poor conversions of starting materials, poor yields (about 20 percent) and very short catalyst life.

U.S. Patent 2,600,289 was issued to Bordner, on an improvement over Yur'ev involving the use of added steam in conducting the reaction. That patent indicated that by using added steam, the Yur'ev reaction could be run at a temperature of 300–600 degrees centigrade using an excess up to about 300 percent of either reactant, with greatly improved conversions and yields and longer catalyst life.

Contrary to the teachings of the prior art, we have now found a way to obtain yields and catalyst life equal to or exceeding those values described in as U.S. Patent 2,600,289 by reacting furan and methyl amine in the presence of a dehydration catalyst, but in the absence of any added steam. It has now been found that in the use of a very large molar excess of furan to methyl amine in a closed loop system, there are critical limits within which yields, catalyst life and relative absence of undesirable by products are greatly improved, and it is this unexpected finding that forms the basis for the present invention. One such critical limit is the use of a molar ratio of furan to methyl amine between about 8 to 1 and 12 to 1 with 10 to 1 being the preferred ratio. Another critical limit is conducting the reaction at a temperature of 320–380 degrees with 340–350 degrees centigrade being preferred. A third critical limit is having unreacted methylamine left as the reaction products pass out of the reaction zone. This requires passing the reactants through the reaction zone at a rate faster than that at which all the methyl amine would be converted. The rate is such that not more than 90 percent and preferably only about 50 percent of the methyl amine is converted in each pass through the reaction zone. Lower conversions than 50 percent of the methylamine are not objectionable except that they lead to excessive recyclings of unreacted material.

Referring to the drawing:

The drawing is a pictorial flow sheet showing the basic apparatus used in the preferred pilot plant operation of the inventive process. Auxiliary equipment has been omitted from the drawing for the sake of clarity but items used are specified in the accompanying process description.

The reactants were anhydrous methylamine and furan, and these materials were provided from both a fresh supply and from the recycling operation hereinafter described. The fresh methylamine was contained in a cylinder from which it was released as a gas through a No. 4 Fischer and Porter rotameter into a pipe leading through a vaporizer and preheater and then into the catalytic reactor 1. The fresh furan was contained in a drum from which it was fed as a liquid through a like rotameter into a pipe leading through the aforementioned vaporizer where it was co-mingled with the methylamine vapor. The mixed vapors traveled thence through the pre-heater into the catalytic reactor. The recycle unreacted furan, in which was dissolved the unreacted methylamine was similarly metered into the furan feed line leading to the vaporizer together with the fresh furan. The rotameters were modified so as to reduce contact between the reactants and the rotameter packing to a minimum. The vaporizer used was a nineteen square foot one-pass carbon steel shell and tube heat exchanger, supplied with 80–85 p.s.i.g. steam on the shellside. This vaporizer was topped with a six-foot length of steam-jacketed (80–85 p.s.i.g. steam) one inch steel pipe which served as a pre-heater. The catalytic reaction chamber 1 was mounted inside a welded carbon steel 20 inch square x 10 foot long rectangular box equipped with eight chromalox 3000 watt, 3 phase, 480 volt heaters and a Fenwall thermo switch five feet from the top. In this box sat the catalyst chamber, 8 feet 11 inches long by 12 inches internal diameter which contained the dehydration catalyst used. Outside the catalyst chamber was mounted a pre-heating coil having a total heated length of 24 feet. The vaporized hot reaction mixture passed through this pre-heating coil and was introduced into the catalyst chamber a few inches from the bottom. The reaction chamber 1 was heated by molten salt contained within the external box. The box was filled to within six inches from the top with Bradford-Mitchell Company Tempering Salt 275 and insulated on the sides and bottom with Johns-Manville Superex. The top was covered with glass wool matting.

The gaseous effluent from the reactor 1 which contained crude N-methyl pyrrole, unreacted furan, methyl amine, and by-product water, was passed through the water-cooled condenser 2 which consisted of a 30 square foot steel single pass shell and tube heat exchanger. The effluent was cooled to a temperature about the boiling point of furan at atmosphere pressure (about 30–32 degrees centigrade), and was then fed to the approximate midpoint of a stripping column 3, in which the N-methyl pyrrole was separated from the unreacted furan and methyl amine. The stripping column 3 was a six foot six inch iron pipe packed with porcelain ½ inch Intalox saddles. This column was mounted on the reboiler 4, which was a 20 gallon Pfaudler glass-lined reactor. The vapor mixture of furan and methylamine leaving the stripping column 3 was passed to the brine-cooled condenser 5, which was a 19 square foot single pass carbon steel heat exchanger where it was liquefied and the non-condensable gases vented. The condensate then passed through a stainless steel fraction splitter 6. The splitter 6 contained a nickel funnel magnetically operated by a timing clock to direct the flow of liquid into either of two compartments at regular time intervals. Part of this liquefied furan-methylamine mixture was returned through the splitter 6 to the stripping column 3 as reflux, and the rest was recycled into the catalytic reactor 1. For optimum efficiency the stripping column reboiler 4 was held at 75–80 degrees centigrade, and the temperature at the head of the stripping column 3 was held to a maximum of 30–31 degrees centigrade, thus providing the separation of the furan-methylamine mixture from the by-product water and the crude N-methyl pyrrole which collected in the reboiler. The water and crude organic products were discharged from the reboiler 4, and the water separated therefrom before loading the crude organic product to the batch product still 7, which was surmounted by a fractionating column 8. This column was a 4 inch glass lined pipe, 20 feet high, packed with ½ inch Intalox saddles. The fractionator 8 gave three overhead products: first a furan fraction which was liquefied in the condenser 9 and recycled to the catalytic reactor 1; second an intermediate fraction containing about 60 percent N-methylpyrrole, 10 percent furan and 30% water, which was separated and discarded before returning the organic portion to the batch product still 7; and third, the high-purity product N-methyl pyrrole. The residue, which was about 10 percent of the weight of the crude product and which contained mostly 2- and 3-methyl pyrroles and dimethyl pyrroles was withdrawn from the still bottoms and discarded. The initial portion of furan was removed at atmospheric pressure. When the temperature in the bottom of the batch product still 7 reached 100 degrees centigrade, distillation was continued at an absolute pressure of 250 mm. of mercury to prevent thermal decomposition of the product.

When these critical limitations are adhered to: passing furan and anhydrous methylamine in an 8–12 to 1 molar ratio, through a catalytic reaction zone maintained at a 320–380 degrees centigrade temperature at such a rate that a substantial amount of the amine remains unreacted, separating the N-methyl pyrrole from the gaseous products leaving the reaction zone recycling the unreacted furan and methylamine back to the reaction zone, and adding necessary makeup of furan and methyl amine to maintain the operating conditions, a continuous process for making N-methyl pyrrole becomes economically feasible.

In the complete recycle continuous anhydrous process for making N-methyl pyrrole, the following variables should be considered:

(1) Contact with catalyst: Maximum dispersion of reactants throughout catalyst zone to render all available catalyst centers operative is desired as in all catalytic processes.

(2) Catalyst: the optimum catalyst is activated alumina, Alcoa F-1 grade, 1–4 inch to 8 mesh or 8–14 mesh. Other conventional dehydration catalysts e.g. Florite desiccant (activated bauxite—Floridin Co.) ¼ inch to ½ inch size are operable but have a shorter catalyst life, poorer production rate and give more by products than the preferred catalyst. The activated alumina is improved markedly by seventy-two hours air-blowing at 400 degrees centigrade.

(3) Catalyst life: Catalysts gave satisfactory operation for as much as four weeks without reactivation. Reactivation rendered the catalyst even more active than before.

(4) Operating temperature: While the production rate is increased by raising the reaction temperature from 320 degrees to 380 degrees centigrade, the optimum range is about 340–350 degrees centigrade. Below 340 degrees centigrade the production rate falls off and above 350 degrees centigrade the by-product formation increases. At the optimum range the by-products amount to about 10 percent of the crude. Since a by-product concentration of 30% materially increases the raw material factor, control of by-product formation temperature becomes vital.

(5) Operating pressure: The reaction is promoted by absolute pressures above 1 atmosphere. At a pressure of two atmospheres the hourly production of product is about 50 percent greater than the hourly production at a pressure of one atmosphere.

(6) Furan to anhydrous monomethylamine weight ratio: Use of a molar ratio of 8–12 to 1 is a critical factor. At ratios outside this range the percent of impurities and undesirable by products formed is increased. Moreover, at ratios below the 8 to 1 lower limit the unreacted methylamine does not entirely dissolve in the furan and recovery from the reaction product is difficult.

(7) Space velocity: Space velocity or retention time of the reactants in the reaction zone was critical in that there had to be sufficient unreacted methylamine left in the effluent from the reaction zone to minimize by-product formation. Also the solubility of methylamine in furan must not be exceeded so as to avoid large amine loss. It was found that a 50 percent amine conversion per pass was best for optimum efficiency.

Too low a conversion rate causes loss of raw materials and reduces catalyst life. Feed rates actually used were varied from about 20–40 pounds per hour per cubic foot of catalyst according to catalyst activity.

Using optimum conditions described herein in a pilot plant operation, 84 percent yields of N-methyl pyrrole based on furan were obtained, and 85 percent yields based on anhydrous methylamine were obtained, and indications were that even better results would be obtainable on full scale commercial production. The catalyst life was not less than four weeks and reactivation of the catalyst by conventional means is feasible.

Using preferred alumina catalyst, a catalyst temperature in the reactor of 340–350 degrees centigrade, a molar ratio of furan to methylamine of 9 to 1 and normal operating pressures the following results were obtained over a five week period:

| Week | Pounds per hour 100 percent N-methyl pyrrole | Pounds of raw materials used per lb. of 100 percent N-methyl pyrrole product | | Percent yield based on— | |
| --- | --- | --- | --- | --- | --- |
| | | Furan | Amine | Furan | Amine |
| 1st | 1.96 | 0.96 | 0.52 | 87.5 | 73.6 |
| 2nd | 2.84 | 1.43 | 0.57 | 58.7 | 66.8 |
| 3rd | 2.84 | 1.52 | 0.52 | 55.3 | 73.7 |
| 4th | 2.69 | 1.08 | 0.54 | 77.8 | 70.9 |
| 5th partial | 4.46 | 1.17 | 0.49 | 69.4 | 77.8 |

Using preferred alumina catalyst, a catalyst temperature in the reactor of 340–350 degrees centigrade, a molar ratio of furan to methylamine of 9.7 to 1, and operating pressures of 14–15 p.s.i.g. over a 5 week period, the production rate rose to an average of 5.6 pounds per hour of 100 percent N-methyl pyrrole, with the yields and relative conversions of raw materials remaining about the same as above.

The invention is not to be limited to the specific embodiments actually shown and described as obvious operative modifications and equivalents within the critical ranges set forth will be apparent to those skilled in the art and therefore is to be limited only by the appended claim.

We claim:

A process for the production of N-methyl pyrrole in a continuous fashion which comprises: passing anhydrous furan and anhydrous methylamine in a molar ratio of about eight to twelve moles of furan per mole of methylamine through a reactor containing an activated alumina catalyst, maintaining said reactor at a temperature of about three hundred and twenty to three hundred and eighty degrees centigrade, cooling the effluent reaction mixture to below about thirty-two degrees centigrade to effect essentially complete condensation, passing said condensate to a stripping column wherein a distillate is stripped off leaving a residuum having a boiling point approximating that of N-methyl pyrrole, said distillate consisting essentially of unreacted furan and methylamine both of these starting materials being recycled from the stripping column to said reactor, and said residuum being passed to a fractionating column wherein a fraction boiling at the boiling point of N-methyl pyrrole is removed, said removed fraction being substantially pure N-methyl pyrrole.

References Cited in the file of this patent

UNITED STATES PATENTS 2,478,452  Bishop ---------------- Aug. 9, 1949
2,525,584  Bordner et al. ---------- Oct. 10, 1950
2,600,289  Bordner ---------------- June 10, 1952

OTHER REFERENCES

Chem. Abstracts, vol. 37, p. 4071 (1943), citing Yur'ev et al., Jour. Gen. Chem. (U.S.S.R.), vol. 11, pages 1128–34 (1941).

Jurjew: Ber. Deut. Chem. Gesell., vol. 69, pp. 1003 and 1944 to 1946 (1936).